US011595329B2

(12) United States Patent
Shang et al.

(10) Patent No.: US 11,595,329 B2
(45) Date of Patent: Feb. 28, 2023

(54) LOCATION BASED CONTENT SYSTEM FOR MOBILE APPLICATIONS

(71) Applicant: YAHOO ASSETS LLC, Dulles, VA (US)

(72) Inventors: Selena Shang, Sunnyvale, CA (US); Anand Tolani, Saratoga, CA (US); Danny Espinoza, Palo Alto, CA (US); Nandaja Ananthanarayanan, Santa Clara, CA (US); Venugopal Kemthur, Cupertino, CA (US); Joshua Robert Russell Jacobson, San Francisco, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 0 days.

(21) Appl. No.: 17/337,592

(22) Filed: Jun. 3, 2021

(65) Prior Publication Data

US 2021/0288929 A1  Sep. 16, 2021

Related U.S. Application Data

(63) Continuation of application No. 15/938,462, filed on Mar. 28, 2018, now Pat. No. 11,038,823.

(51) Int. Cl.
*G06F 15/173* (2006.01)
*H04L 51/046* (2022.01)
(Continued)

(52) U.S. Cl.
CPC ........ *H04L 51/046* (2013.01); *G06F 16/9535* (2019.01); *G06F 16/9537* (2019.01);
(Continued)

(58) Field of Classification Search
CPC ....... H04L 51/046; H04L 51/20; H04L 51/24; H04L 51/38; H04L 51/12; H04L 51/36;
(Continued)

(56) References Cited

U.S. PATENT DOCUMENTS

2010/0075638 A1* 3/2010 Carlson .............. G06Q 20/3227
455/466
2012/0265590 A1* 10/2012 Mesaros ................ G06Q 30/08
705/14.35
(Continued)

*Primary Examiner* — Karen C Tang
(74) *Attorney, Agent, or Firm* — James J. DeCarlo; Greenberg Traurig, LLP

(57) ABSTRACT

Disclosed are systems and methods for improving interactions with and between computers in content searching, hosting and/or providing systems supported by or configured with devices, servers and/or platforms. The disclosed systems and methods provide a novel framework for providing users with electronic retrieval capabilities that are activated upon the users' determined locations respective to real-world locations associated with a message providing entity. The disclosed technology combines the previously separate systems of mail extraction, geo-fencing and content delivery (e.g., notification) into a single system that efficiently manages a user's inbox in order to provide the user with content the user has expressly indicated is of interest to that user. The disclosed systems and methods effectively realize a location-aware mail experience that provides functionality for delivering location (and timing) specific content to a user when the user is actually capable of acting on/interacting with the content in real-time.

20 Claims, 11 Drawing Sheets

(51) Int. Cl.
*H04W 4/021* (2018.01)
*G06F 16/9535* (2019.01)
*G06F 16/9537* (2019.01)
*H04L 51/58* (2022.01)
*H04L 51/222* (2022.01)
*H04L 51/224* (2022.01)
*G06F 15/16* (2006.01)

(52) U.S. Cl.
CPC .......... *H04L 51/222* (2022.05); *H04L 51/224* (2022.05); *H04L 51/58* (2022.05); *H04W 4/021* (2013.01)

(58) Field of Classification Search
CPC ............. G06F 16/9535; G06F 16/9537; G06F 16/909; H04W 4/021; H04W 4/023; H04W 4/12
USPC .......................................... 709/224, 231, 207
See application file for complete search history.

(56) References Cited

U.S. PATENT DOCUMENTS

| | | | |
|---|---|---|---|
| 2013/0111400 A1* | 5/2013 | Miwa | H04N 5/23212 715/835 |
| 2013/0198281 A1* | 8/2013 | Scuba | H04W 4/21 709/204 |
| 2014/0164121 A1* | 6/2014 | Payne | G06Q 30/0207 705/14.58 |
| 2015/0039549 A1* | 2/2015 | Aufmann | G06Q 30/0631 706/46 |
| 2015/0186494 A1* | 7/2015 | Gilad | H04L 51/22 707/740 |
| 2015/0372955 A1* | 12/2015 | Janakiraman | H04L 51/12 707/731 |
| 2015/0381544 A1* | 12/2015 | Geva | H04L 51/36 715/752 |
| 2017/0093778 A1* | 3/2017 | Jones | H04L 51/24 |
| 2018/0032997 A1* | 2/2018 | Gordon | G06Q 30/0269 |
| 2018/0341965 A1* | 11/2018 | Rapperport | G06Q 30/0255 |
| 2019/0140997 A1* | 5/2019 | Lewin-Eytan | G06Q 10/107 |
| 2019/0213573 A1* | 7/2019 | Zelten | G06Q 30/016 |

* cited by examiner

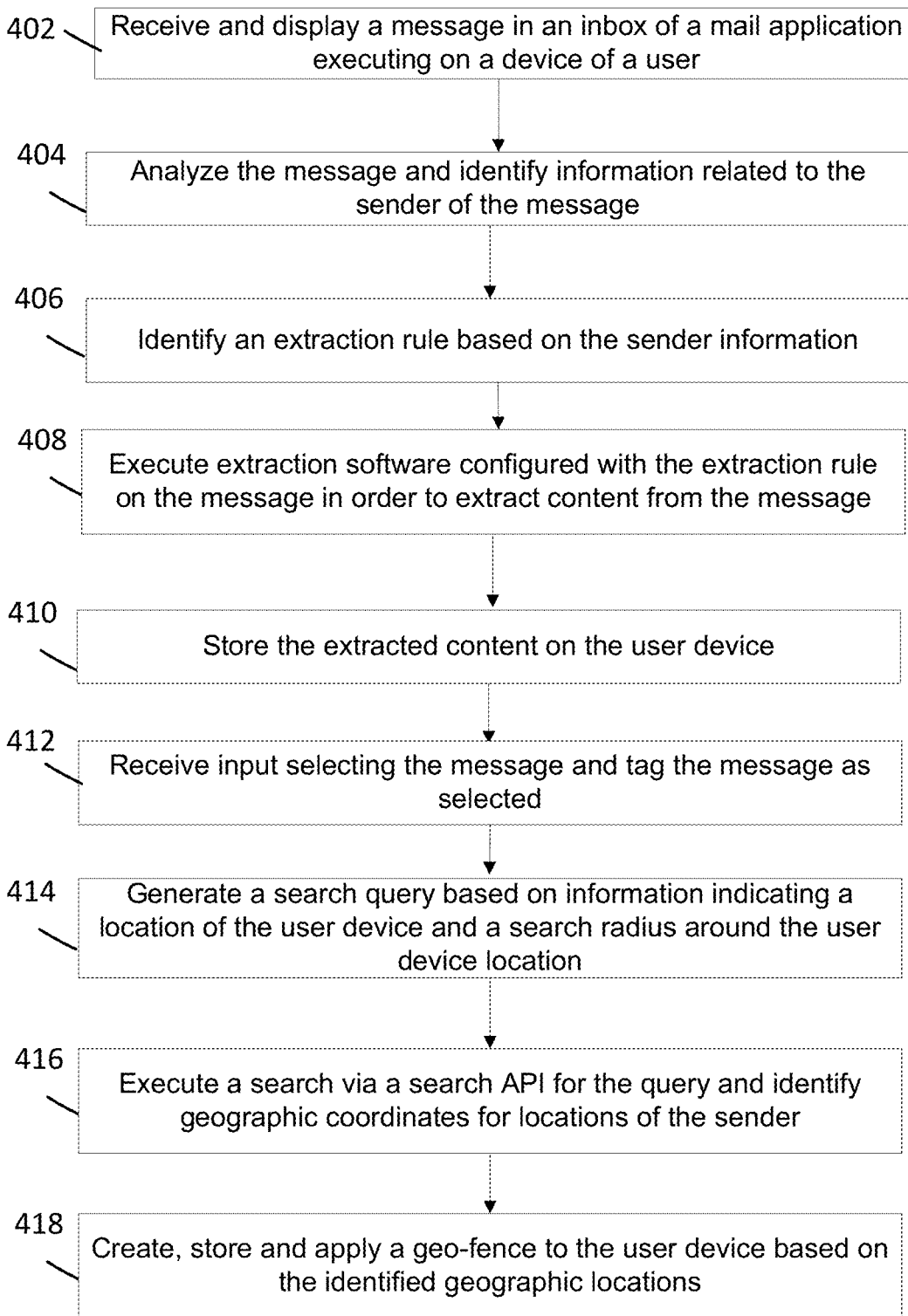

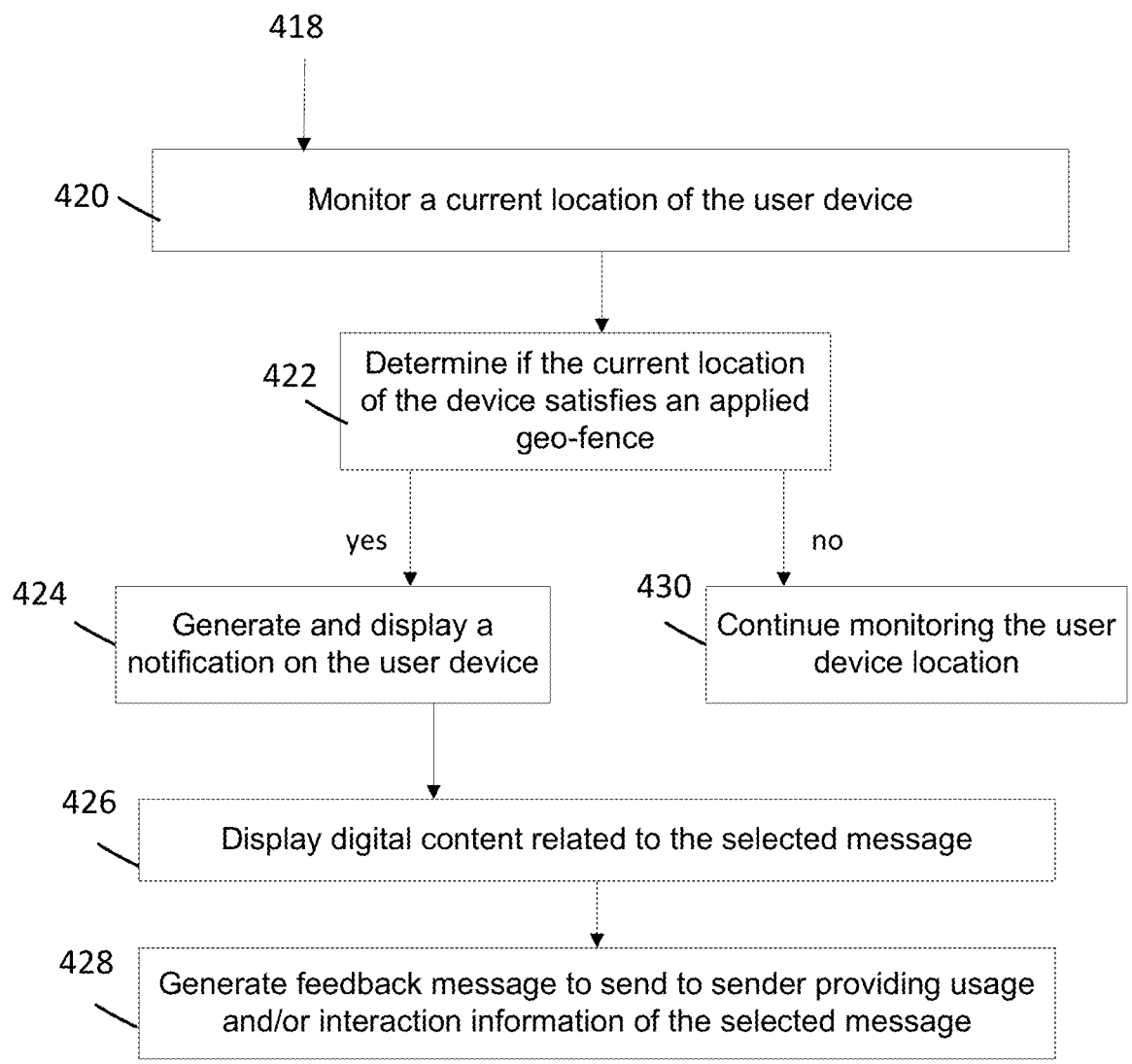
FIG. 4B    400 continued

LOCATION BASED CONTENT SYSTEM FOR MOBILE APPLICATIONS

This patent application claims the benefit of and is a continuation of U.S. patent application Ser. No. 15/938,462, filed on Mar. 28, 2018, which is incorporated by reference herein in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content hosting and providing devices, systems and/or platforms by modifying the capabilities and providing non-native functionality to such devices, systems and/or platforms through a novel and improved framework for leveraging a user's mobile application usage and geographic location information in order to provide contextually relevant, geo-fenced digital content.

BACKGROUND

Today's modern user receives a large amount of messages (electronic mail, "email") in his/her inbox. A significant number of these messages come from senders that are attempting to persuade the user to perform certain activities online and/or in the real-world. For example, a sender may be the company Target®, and by sending a user an email that comprises a 30% off coupon, the company is attempting influence the user's activity in visiting one of their "brick-and-mortar" stores in the user's area to redeem the coupon. However, many of these types of messages are lost in the user's inbox. That is, the user's device and/or applications hosting the inbox do not currently have a way to figure out what pieces of content are relevant to a user, and they certainly do not have the capabilities for determining when, where and/or how they are relevant to the user.

Conventional systems attempt to discern this information by analyzing a user's past behavior and/or expressed interests (e.g., from their profiles); however, these types of data form only a small subset of information that evidences a user's interests. That is, if a user states they are into fashion, and they like a particular brand, this does not provide evidence that the user is solely into that brand, and/or only wants to receive information about that brand. Therefore, sending the user content for that particular brand evidences the inefficiency of the platforms sending users content, as they are incapable of processing higher value data that indicates how users act, and for which purposes such actions are performed.

Also, by sending users digital content with the singular focus on their expressed interests/behaviors, as in most conventional systems, the devices and networks hosting such systems are continuously wasting device and network resources. They are sending data over a network not only increasing network traffic and reducing network bandwidth, but also flooding user inboxes with information the user may not be interested in that moment, if at all, thus wasting valuable storage space at the server and device level. For example, a user's inbox becomes clogged with unwanted messages bordering on a "spam" classification, which may eventually lead to the user abandoning the message platform for a fresh start on another.

SUMMARY

The disclosed systems and methods provide a technical solution to existing technical problems, especially those highlighted above, by providing an improved framework for providing users with electronic retrieval capabilities that are activated upon the users' locations being determined to correspond to real-world locations associated with the provided content. The disclosed technology combines the functions of mail extraction, geo-fencing and content delivery (e.g., notification) into a unified platform that efficiently manages a user's inbox in order to provide the user with content the user has expressly indicated is of interest to that user. Thus, the disclosed systems and methods effectively realize a location-aware mail experience that provides functionality for delivering location (and timing) specific content to a user when the user is actually capable of acting on/interacting with the content in real-time.

As evidenced from the disclosure herein, the efficient manner in which the devices executing on/within the disclosed framework perform embodies a novel and unconventional technique for mail extraction, geo-fencing and content delivery functions to interact and exchange information. The disclosed framework enables geo-fencing functionality to act upon information identified from mail extraction functionality, upon which content delivery functionality is based. This embodies a new way for a user's mailbox to function, manage and control messages received/stored therein, such that only when necessary, is a user alerted to content that is redeemable from the user's mailbox.

In accordance with one or more embodiments, the instant disclosure provides computerized methods for the mobile application and location-based content providing framework discussed herein, as well as a non-transitory computer-readable storage medium for carrying out the above mentioned technical steps of the mobile application and location-based content providing framework. The non-transitory computer-readable storage medium has tangibly stored thereon, or tangibly encoded thereon, computer readable instructions that when executed by a device (e.g., application server, messaging server, content server and/or client device, and the like) cause at least one processor to perform a method for a novel and improved framework for leveraging a user's mobile application usage and geographic location information in order to provide contextually relevant, geo-fenced digital content.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIGS. 4A-4B are flow diagrams illustrating steps performed in accordance with some embodiments of the present disclosure.

DESCRIPTION OF EMBODIMENTS

Figure 1:
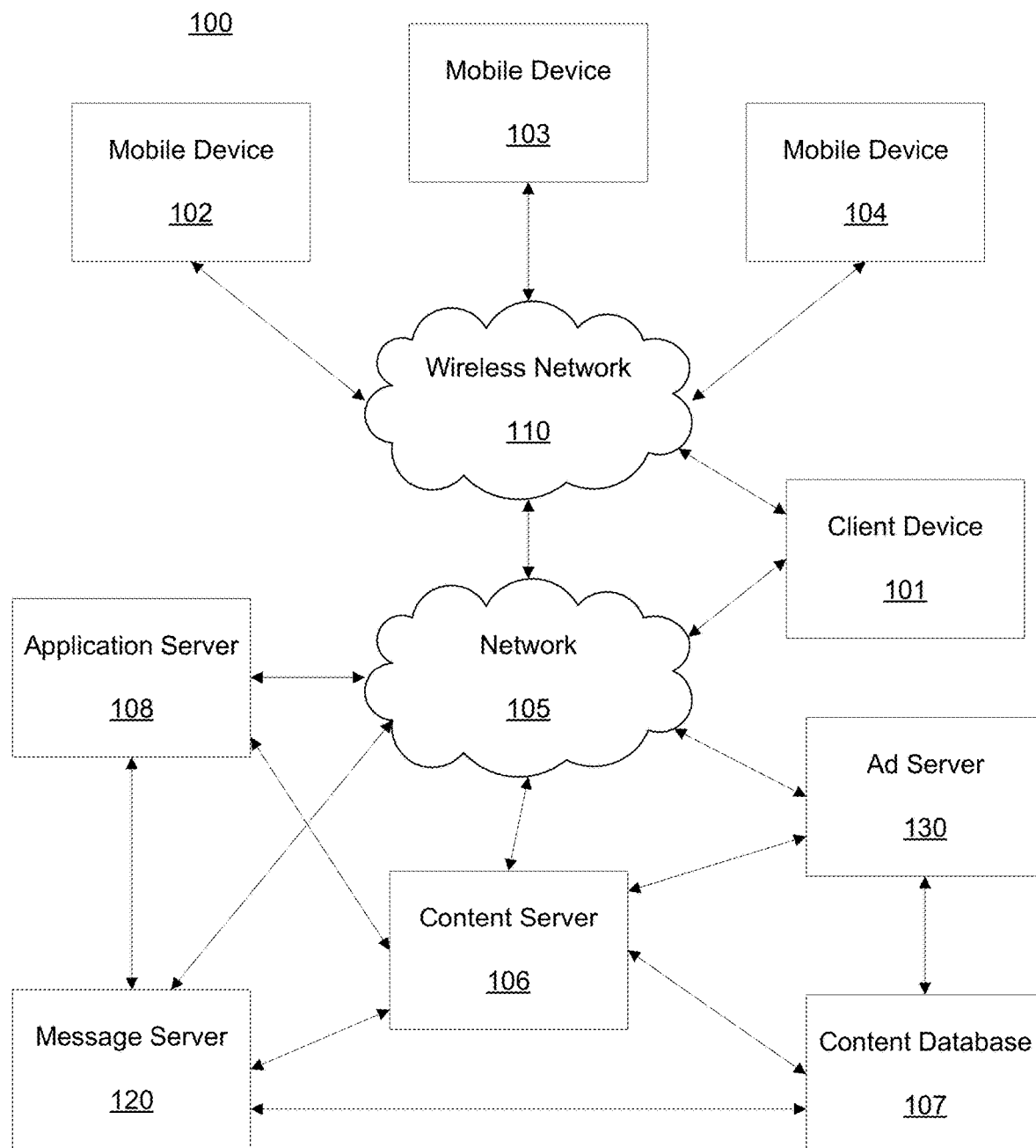
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of possible applications, such as a client software application enabling communication with other devices. A client device may also include or execute an application to communicate content, such as, for example, textual content, multimedia content, or the like. A client device may also include or execute an application to perform a variety of possible tasks, such as browsing, searching, playing, streaming or displaying various forms of content, including locally stored or uploaded images and/or video, or games (such as live broadcasts of professional sporting events).

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

The principles described herein may be embodied in many different forms. The disclosed systems and methods provide advanced mechanisms for leveraging a user's mobile application usage and determined geographic location information in order to provide contextually relevant, geo-fenced digital content.

As discussed above, conventional mail systems are capable of receiving contextually relevant messages; however, these systems lack the capabilities or functionality to mine the user's inbox and deliver the content comprised therein to the user at opportune times and/or locations. That is, there is no current system that enables the content of such messages to be extracted and utilized to provide users with an alert as to where, when and why such content is capable of being redeemed and/or acted upon.

The disclosed systems and methods provide a novel framework for providing users with electronic retrieval capabilities that are activated when the users' determined locations correspond to respective to real-world locations associated with a message providing entity. The disclosed technology combines the previously separate systems of mail extraction, geo-fencing and content delivery (e.g., notification) into a single system that efficiently manages a user's inbox and provides the user with functionality for receiving content the user has expressly indicated is of interest to that user. Thus, the disclosed systems and methods effectively realize a location-aware mail experience that provides novel and unconventional functionality for delivering location- (and timing-) specific content to a user when the user is actually capable of acting on/interacting with the content.

By way of a non-limiting example, user Bob receives a message in his inbox from company Target®, and the message includes a 30% off coupon for purchases occurring "in-store." Conventional systems would simply send such message to a user, or at the most, display the offer within a side-panel or pane within the inbox's user interface (UI).

Present systems do not mine these messages to timely and/or geographically deliver the message's content to the user. However, with the advent of the disclosed technology herein, user Bob is now capable of marking or tagging (referred to as "clipping," as discussed in more detail below) the Target message which causes the mail system to perform a number of computational steps that enables Bob to receive an alert the next time he is within a predetermined distance (e.g., within a defined radius) to a Target store. Alternatively the system may automatically "clip" or otherwise identify a coupon or promotion stored or part of an email or message based on proximity to a store.

For example, as discussed in detail below in relation to FIGS. 4A-5F, upon the user receiving a message in their inbox from Target®, the disclosed systems and methods analyze the message and identify the sender of that message (e.g., identify the sender's email address from the message's metadata or from within the body of the message). Then, utilizing this sender information, a search is performed that identifies an extraction rule that is associated with and defined by types of messages corresponding to that particular sender (or domain, or type of sender—see Table 1 below).

The disclosed framework then executes extraction software configured with the loaded extraction rule that enables the identification of the critical information within the message—for example, the details of the offer relating to the amount of the coupon, its effective dates, and the like. This extracted information is then stored for later retrieval when the user is determined to be near a Target store location, as discussed herein.

According to some embodiments, for example, the extraction of the information from the message involves extracting structured data from semi-structured content (HTML). As discussed herein, in order to apply the correct extraction rule to a message, an email sender/subject regex is checked and an appropriate extraction rule for this type of message identified. In some alternative embodiments, a hash can be computed based on the structure of the content of the message which can be utilized to identify the extraction rule from the regex. The identified extraction rule is then applied to the semi-structured content (HTML) to generate structured data, which can be enhanced (by mapping a sender identifier(s), store identifier(s) and modification of content features/attributes, as discussed below), and stored as a separate message in the user's inbox. A link is then created between the email and the message containing structured data, which enables navigation between the extracted content and the original message. Therefore, for example, when a user opens a message, the extracted content (e.g., coupons) can be displayed in a rich view, or the user can be shown a list of coupons which the user can navigate and utilize in order to locate the email from which a specific coupon originated from (i.e., was extracted from), as discussed in more detail below.

Continuing with the example, according to embodiments of this disclosure, the user then provides a selection that indicates he/she is interested in the coupon from Target (i.e., the "clipping" mechanism discussed herein and below). As a result of this "clipping," another search is performed for purposes of identifying local stores proximate to the user's location. The search can include a query comprised of information indicating the user's location (e.g., home, work, and/or current location). This search returns a result that identifies the physical geographical coordinates of stores at and/or around the user's location (within a predefined radial distance). In some embodiments, as discussed below, such location information can be in the form of GPS coordinates, triangulated cellular location, local sensor (e.g. BLE) data, or other location detection information. Then, in some embodiments, as discussed below, a mail backend API filters out the stores that are not associated with the sender—i.e., identifies the Target stores that are within the radial distance to the user.

Upon receiving this information, the disclosed framework generates geo-fence(s) for each of the identified stores. That is, for each store, a geo-fence is created based on the coordinates for that store and is saved on the client's device. Thus, when the user's device is detected, determined or otherwise identified to be at or within the physical confines of the geo-fence, the framework detects this occurrence and surfaces the corresponding offer received from the store's company. In this example, the extracted 30% offer from Target is identified and a notification is generated. As discussed in more detail herein, the notification can be generated via the mail application executing on the user's device and/or via the mail application communicating through the notification capability of the user's mobile device (or operating system therein) of the user (e.g., a banner display, an SMS or MMS message, an email, an audio alert, a phone ring, and the like, as discussed herein). The notification acts as a reminder of the message that enables the user to access the offer when the user is at the store's location, thereby resulting in an increased likelihood the coupon will be acted on by the user.

Providing this more contextually relevant notification to users can lead to an increased click-through rate (CTR) of such coupon-related ads and messages and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein). Additionally, data can be generated that provides the framework with a way to verify which coupons have been acted on, and where they have been acted on (e.g., which stores users have walked into to redeem the coupons), as discussed in detail below.

In some embodiments, as discussed below, upon the clipping of the message occurring, the notification being generated, and/or upon the coupon being acted upon, the disclosed framework can cause the user's device to provide the server with information indicating such event. This enables the providing entity to receive feedback as to how effective their ads are for specific types of users. In some embodiments, this data can also be provided to other third party providers separate from the sender.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, message (or messaging) server 120 and advertising ("ad") server 130.

One embodiment of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above. As such, mobile devices 102-104 typically range widely in terms of capabilities and features.

Mobile devices 102-104 also may include at least one client application that is configured to receive content from another computing device. In some embodiments, mobile devices 102-104 may also communicate with non-mobile client devices, such as client device 101, or the like. In one embodiment, such communications may include sending and/or receiving messages, searching for, viewing and/or sharing photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

Network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

The content server 106 may include a device that includes a configuration to provide any type or form of content via a network to another device. Devices that may operate as content server 106 include personal computers desktop computers, multiprocessor systems, microprocessor-based or programmable consumer electronics, network PCs, servers, and the like. Content server 106 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user data. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en-masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a mail or messaging application (e.g., Yahoo!® Mail, Yahoo!® Messenger), a photo sharing/user-generated content (UGC) application (e.g., Flickr®, Tumblr®, and the like), a streaming video application (e.g., Netflix®, Hulu®, iTunes®, Amazon Prime®, HBO Go®, and the like), blog, photo or social networking application (e.g., Facebook®, Twitter® and the like), search application (e.g., Yahoo!® Search), and the like, can be hosted by the application server 108 (or content server 106, message server 120 and the like).

Thus, the application server 108, for example, can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
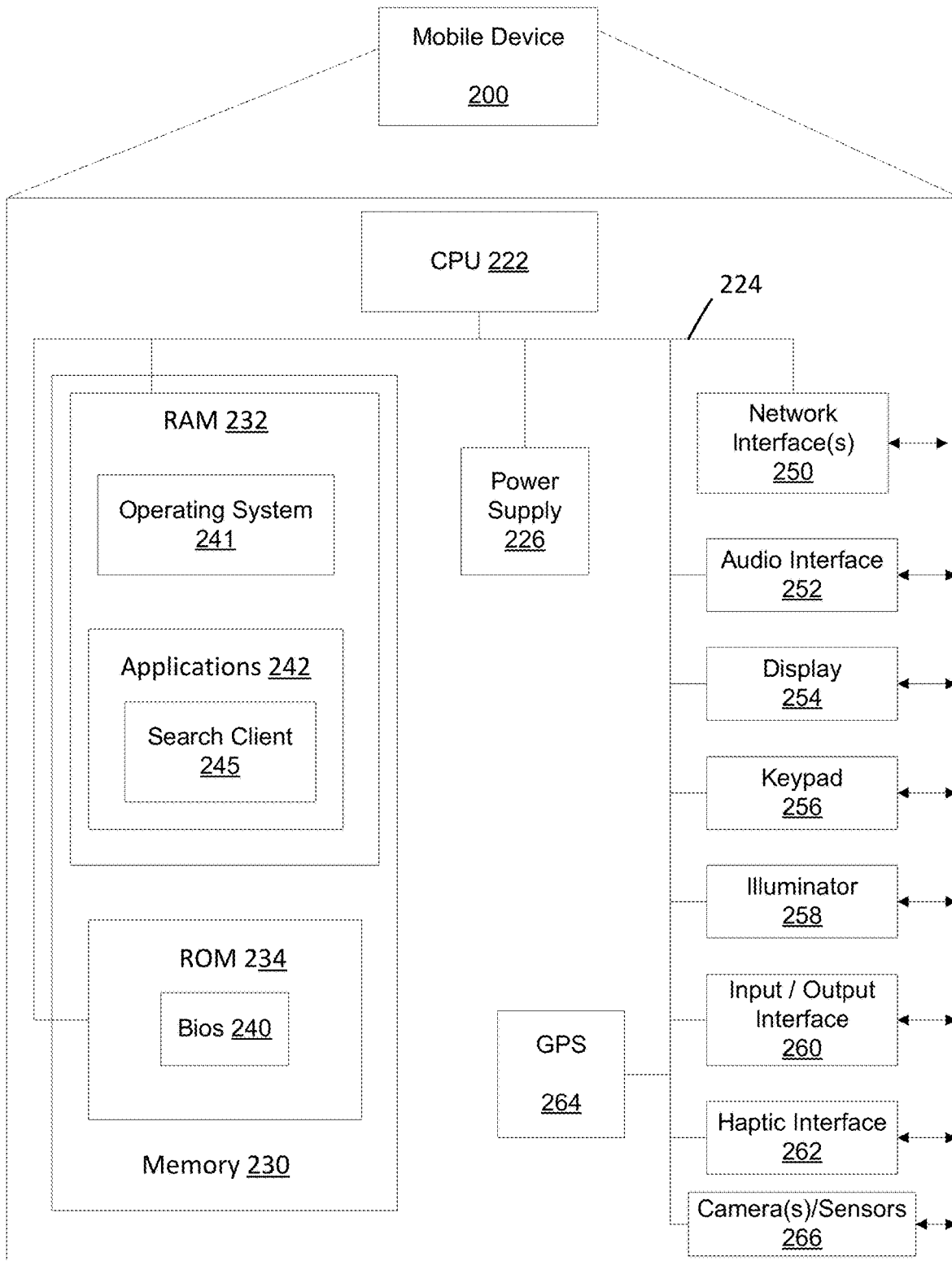
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof. Power supply 226 provides power to Client device 200.

Client device 200 may optionally communicate with a base station (not shown), or directly with another computing device. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. Illuminator 258 may provide a status indication and/or provide light.

Client device 200 also comprises input/output interface 260 for communicating with external. Input/output interface 260 can utilize one or more communication technologies, such as USB, infrared, Bluetooth™, or the like. Haptic interface 262 is arranged to provide tactile feedback to a user of the client device.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200

Memory 230 further includes one or more data stores, which can be utilized by Client device 200 to store, among other things, applications 242 and/or other information or data. For example, data stores may be employed to store information that describes various capabilities of Client device 200. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Applications 242 may further include search client 245 that is configured to send, to receive, and/or to otherwise process a search query and/or search result.

Having described the components of the general architecture employed within the disclosed systems and methods, the components' general operation with respect to the disclosed systems and methods will now be described below with reference to FIGS. 3-8.

Figure 3:
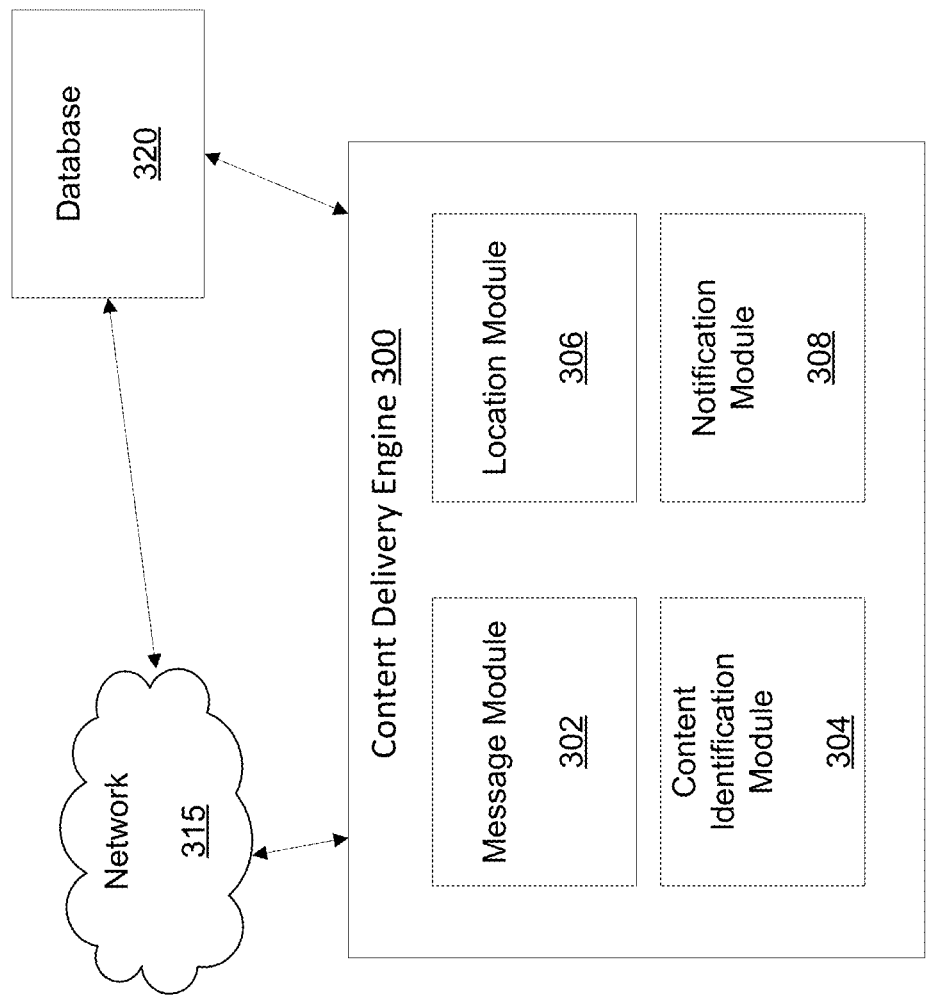
FIG. 3 is a block diagram illustrating components of an exemplary system in accordance with embodiments of the present disclosure.

FIG. 3 is a block diagram illustrating the components for performing the systems and methods discussed herein. FIG. 3 includes a content delivery engine 300, network 315 and database 320. The content delivery engine 300 is a special purpose machine or processor and could be hosted by an application server, content server, social networking server, web server, search server, content provider, third party server, user's computing device, and the like, or any combination thereof.

According to some embodiments, content delivery engine 300 can be embodied as a stand-alone application. In some embodiments, the content delivery engine 300 can function as an application installed on the user's device, and in some embodiments, such application can be a web-based application accessed by the user device over a network. In some embodiments, the content delivery engine 300 can be installed as an augmenting script, program or application to another messaging and/or media content hosting/serving application, such as, for example, Yahoo!® Mail, Yahoo!® Messenger, Yahoo!® Search, Flickr®, Tumblr®, Twitter®, Instagram®, SnapChat®, Facebook®, and the like.

The database 320 is a database or memory associated with a content server on a network (e.g., content server 106, message server 120, ad server 130 or application server 108 from FIG. 1) or a user's device (e.g., device 101-104 or device 200 from FIGS. 1-2). Database 320 can comprise, for example, a dataset of content items, device data and associated metadata, and user data and associated user metadata. Such information can be stored in the database 320 independently and/or as a linked or associated dataset. It should be understood that the data (and metadata) in the database 320 can be associated with any type of content, user, device or network information and type, whether known or to be known, without departing from the scope of the present disclosure.

Database 320 comprises a dataset of data and metadata associated with content items. For purposes of the present disclosure, reference to content items will be made with regard to electronic messages (comprising digital content) as a whole; however, it should not be construed to limit the applications of the systems and methods discussed herein. While reference is made throughout the instant disclosure to electronic messages or email messages, other forms of electronic documents or transmissions (e.g., Short Message Service (SMS) messages, Multi-media Message Service (MMS) messages, and the like) can be communicated and/or accessed and processed by the content delivery engine 300 according to the systems and methods discussed herein. For example, content within a message or electronic document or file, and such items, can include any type of known or to be known form of digital content, whether as a whole file or included within a file, including, messages, text, audio, video, short form videos, multi-media, and the like.

The messages and the data and metadata of such messages processed according to the disclosed systems and methods, and stored in database 320, can be any type of message. Examples of such messages can include, but are not limited to, email messages, HTML forms SMS/MMS messages, Skype® messages, Twitter® messages and other social messages, comments to an article or website, online forum posts/entries, word processing documents, help desk messages, portable document format (PDF) documents and/or other types of documents. The messages can be provided to the content delivery engine 300 or accessed by a computer program or device that can access the messages. In some embodiments, the messages can be stored in a database of stored messages 320, which is associated with an email provider, such as Yahoo! Mail®.

Database 320 can also comprise a dataset of data and metadata associated with local and/or network information related to users, devices, services, applications, user-generated content, third party provided content, and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, i.e., user data. According to some embodiments, the stored user data can include, but is not limited to, information associated with a user's profile, user account(s), user interests, user behavioral information, user attributes, user preferences or settings, user demographic information, user location information, user biographic information, and the like, or some combination thereof.

According to some embodiments, the user data can also include, for purposes searching, receiving and/or displaying messages, rendering and/or displaying content, and/or downloading, streaming and/or accessing applications on or over the network, device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can comprise information associated with content providers, such as, but not limited to, messaging platforms, applications, sites, or providers that enable users to send, receive, search for, upload, download, share, edit or otherwise avail users to content (e.g., Yahoo!® Search, Yahoo!® Mobile applications, Yahoo!® Mail, Flickr®, Tumblr®, Twitter®, Instagram®, SnapChat®, Facebook®, and the like).

In some embodiments, the information stored in database 320 can be represented as an n-dimensional vector (or feature vector) for each stored data/metadata item, where the information associated with, for example, the stored data and/or metadata can correspond to a node(s) on the vector. As such, database 320 can store and index stored information in database 320 as linked set of data and metadata, where the data and metadata relationship can be stored as the n-dimensional vector discussed above. Such storage can be realized through any known or to be known vector or array storage, including but not limited to, a hash tree, queue, stack, VList, or any other type of known or to be known dynamic memory allocation technique or technology. While the discussion of some embodiments involves vector analysis of stored information, as discussed above, the information can be analyzed, stored and indexed according to any known or to be known computational analysis technique or algorithm, such as, but not limited to, word2vec analysis, cluster analysis, data mining, Bayesian network analysis, Hidden Markov models, artificial neural network analysis, logical model and/or tree analysis, and the like.

In some embodiments, database 320 can be a single database housing information associated with one or more devices, users, services and/or content providers, and in some embodiments, database 320 can be configured as a linked set of data stores that provides such information, as each datastore in the set is associated with and/or unique to a specific user, device, service and/or content provider.

As discussed above, with reference to FIG. 1, the network 315 can be any type of network, and as illustrated in FIG. 3, the content delivery engine 300 and database 320 can be directly connected by any known or to be known method of connecting and/or enabling communication between such devices and resources.

The principal special purpose processor, server, or combination of devices that comprises hardware programmed in accordance with the special purpose functions herein is referred to for convenience as message module 302, content identification module 304, location module 306 and notification module 308. It should be understood that the engine(s) and modules discussed herein are non-exhaustive, as additional or fewer engines and/or modules (or submodules) may be applicable to the embodiments of the systems and methods discussed.

Turning to FIGS. 4A-4B, Process 400 details steps performed in accordance with some embodiments of the present disclosure for providing location-specific (or location sensitive) digital content to users that is derived/retrieved from messages received in the user's inbox.

Steps 402 and 412 of Process 400 are performed by the message module 302 of the content delivery engine 300; Steps 404-410 are performed by the content identification module 304; Steps 414-422 and 430 are performed by the location module 306; and Steps 424-428 are performed by the notification module 308.

Process 400 begins with Step 402 where a message addressed to a user is received in an inbox of the user. particular types of domains. For example, as illustrated in Table 1 below, a sender, such as Amazon®, provides services for users to order products online from their hosted platforms. These messages typically have the same format, and follow a site or platform-type specific format where the content included therein is variable or standard. The standard information relates to how the data is displayed within the message, and variable information is the message-specific content (e.g., what was ordered and/or what specific content was included in the message). Therefore, an extraction rule is created for these types of messages so that when the rule is applied to these types of message, the unique, important information related to the order can be quickly identified and extracted from the message.

Table 1 provides an example listing of types of sending entities, the description of their network services and example domains that provide such services:

| Entity | Description | Domains |
| --- | --- | --- |
| Order | Create Order/Cancel Order | Amazon, Walmart . . . |
| Coupon | Extract one or more coupons | Groupon, LivingSocial . . . |
| EventReservation | Create/Cancel Event Reservation | Eventbrite, Evite . . . |
| Invoice | Create Invoice | AT&T, Verizon . . . |
| LodgingReservation | Create /Cancel Lodging Reservation | Marriott, IHG . . . |
| Parce Delivery | Shipment, Shipment Status | Amazon, USPS, UPS . . . |
| ReservationPackage | Book Flight, Modify/Cancel | Southwest, United . . . |
| TaxiReservation | Book Taxi/Cancel Taxi reservation | Uber, Lyft . . . |
| RentalCarReservation | Book Rental Car/Cancel Reservation | Avis, Hertz . . . |
| FoodEstablishmentReservation | Reserve Table/Cancel Reservation | Opentable, Seatme . . . |
| TrainReservation | Book/Cancel Train Reservation | Amtrak, IRCTC . . . |

Figure 5A:
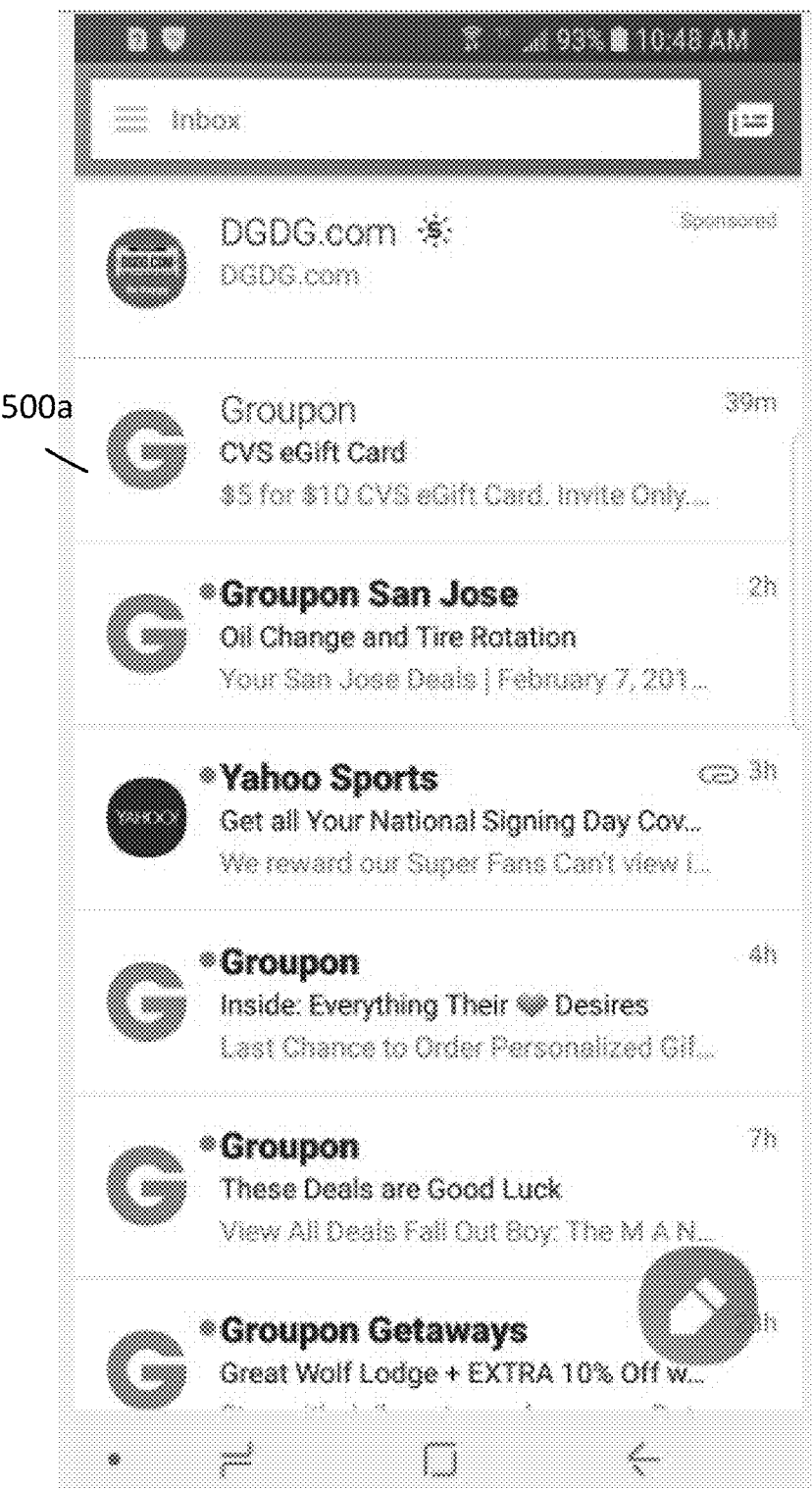
FIGS. 5A-5F illustrate non-limiting embodiments of the content identification and delivery functionality performed by the content delivery engine according to some embodiments of the instant disclosure.

According to embodiments of the instant disclosure, the inbox is loaded as a part of a mail (or messaging) application (e.g., Yahoo® Mail) that is executing on the user's device. For example, as depicted in FIG. 5A, inbox 500 is displayed and message 500a is displayed therein as a received message.

In Step 404, the received message is analyzed and sender information of the message is identified. The sender information can be identified from the data and/or metadata of the message. The sender information can include, but is not limited to, an email address of the sender, a network identifier of the sender, a user name of the sender, the IP address of the sender, and the like, or any other identifier of a sender of a message that is included in or accompanies or identifies a message sent by the sender.

According to some embodiments, the analysis performed in Step 404 involves the engine 300 receiving information identifying the reception of the message (e.g., a "new mail event"), and performing a data extraction, mining and/or identification algorithm or technique that results in the identification of the sender information from the data/metadata of the message. Any type of known or to be known data extraction, mining, and/or learning algorithm or technique can be utilized to identify the sender information, including, for example, expression or pattern matching, or regression analysis, and the like.

In Step 406, an extraction rule is identified that corresponds to a type of sender that sent the message. The extraction rule corresponds to types of messages sent from In some embodiments, Step 406 involves generating a search query including the identified sender information that is utilized to search the compiled listing of extraction rules. The listing of extraction rules can be saved in database 320, which as discussed above, can be locally accessible by the user's device, or searchable via a network search when the database 320 is hosted on the network.

By way of a non-limiting example, in order to illustrate Steps 402-406 of Process 400, user Bob receives a message from Walmart®. The message is analyzed and it is determined that Walmart® is the sender (e.g., orders@walmart.com). This information is then utilized to search the extraction rule list, and since Walmart provides "order" services, the extraction rule for "orders" is identified. As discussed below, this rule is utilized to identify and extract the information from the message for later display to the user.

Continuing with Process 400, Step 408 involves the configuration of the content identification module 304 with the identified extraction rule (that is specific to the type of the received message)—that is, module 304 executing extraction software that is configured with the extraction rule identified in Step 406. The extraction software executes an extraction algorithm, technique or technology, via definitions that comport with the extraction rule, in order to extract the variable content from the message. Such algorithms, techniques, or technologies can include, but are not limited to, feature extraction, cluster analysis, word2vec analysis, edge detection, Hidden Markov models, artificial neural network analysis, logical model and/or tree analysis, and the like.

Thus, as a result of Step 408, content from the message is extracted and stored. Step 410. In some embodiments, the storage of the extracted message content can involve engine 300 creating a "hidden" folder (or file) within the inbox of the user, or on the user's device, where the extracted content is stored. The folder is "hidden" in that a user cannot view it, but the device and/or engine 300 is capable of accessing, reading and/or writing to the folder. Such storage can involve storing the sender information, user information and extracted content in association with each other in a look-up-table (LUT) for later retrieval, as discussed in more detail herein. The LUT can further include, but is not limited to, information indicating the spatial and/or temporal information related to the message and/or its extracted content (e.g., when the content extracted from the message expires (when the content is no longer usable)). In some embodiments, the extracted content can be stored in association with folder 502 from FIG. 5B.

By way of a non-limiting example, continuing with the above Walmart® message example, the message includes digital content corresponding to a 30% discount for "in-store" purchases. Thus, the message information related to this content is extracted (via Step 410) and is stored (in Step 410).

In Step 412, the user interacts with the message and provides an indication that the message is selected—referred to as a "clipping" interaction or operation. The "clipping" action provides an indication to the engine 300 that the user has selected the message and desires that the message content included therein be saved. Such saving of the message content can occur locally on the user's device, or on the network, as discussed in more detail below. In some embodiments, the entire message can be saved; and in some embodiments, only specific portions of the message content are saved, as discussed herein.

In some embodiments, the clipping action can be effectuated by the user interacting with (via a mouse input, touch input, voice input, facial or eye recognition input, and the like, or any other known or to be known type of input that identifies a user's selection from an object on a display screen) an interface object associated with or representing the message. Such object can be displayed next to the message in the inbox prior to the message being opened by the user, can be displayed in a browser toolbar or interface toolbar displayed prior to opening or upon opening the message, or any other form of interface object that provides a user with the capabilities of saving or indicating an interaction with a message. In some embodiments, the user can select the message or specific content included therein, thereby triggering the clipping action that indicates the user desires to save the message content.

In some embodiments the system can automatically "clip" or indicate interest in an email or promotion based on a user pre-indicated preference, for example via a user profile entry or preference selection entry that indicates the user wishes to be automatically notified of all coupons or promotions for a particular retailer or retail location they visit, such as by way of non-limiting example "all coupons for Target stores" or "all stores in the Florida Mall".

Figure 5B:
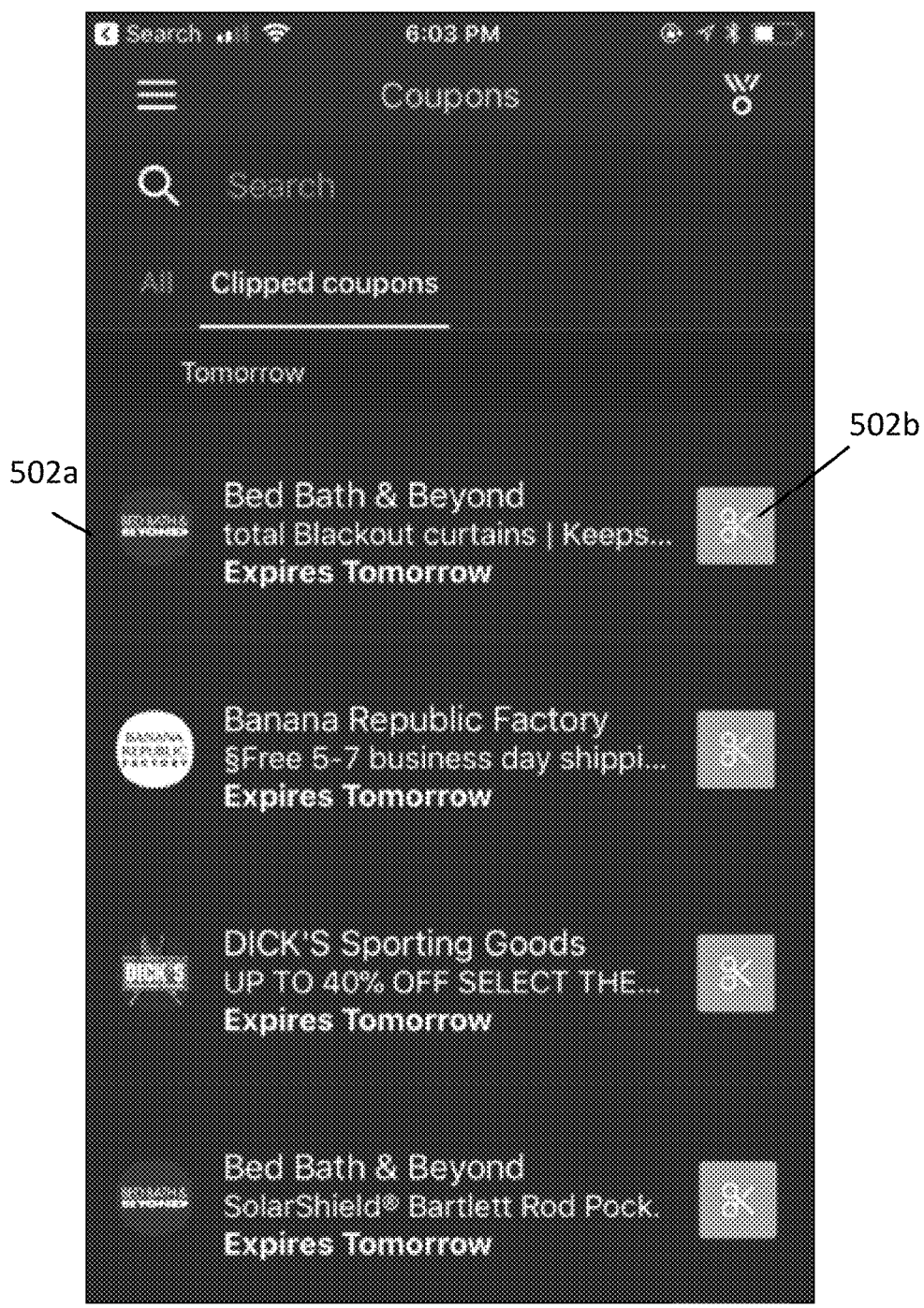

In some embodiments, as illustrated in FIG. 5B, the inbox includes a "smart view" folder 502 where all saved messages are stored and/or copied (from the main inbox). This smart view folder stores the message information for message the user has selected. For example, message 502a was selected by the user and is displayed within this folder 502. The folder includes a feature, item 502b, that indicates the message has been clipped, as discussed herein. The folder 502 provides another view for the user to later search for, view and/or identify messages that the user has indicated he/she is interested in (e.g., for example, the user can easily view the messages he/she or the system has "clipped" in order to search for messages that have specific types/forms of content).

In Step 414 of Process 400, engine 300 then generates a search query for location information related to physical stores (e.g., points of interest (POI)) of the sender. The search query is based on information indicating a location of the user's device and a search radius around the user device location. The location of the user's device can be the user's current location (detected from GPS functionality executing on the device when the message was received, for example), the user's home location (e.g., the user's known home address), the user's work address, and the like. Thus, the user's location can account not only for spatial information, but also temporal information given that the user may typically frequent different locations at different times of the day.

The search radius can be based on a predetermined radius or area around the user. The radius need not define a perfectly circular area, but as used herein may be adaptably shaped to conform to neighborhoods, blocks, shopping centers, or other complex areas definable in a mapped area. For example, it is typically understood that a user is usually willing to travel around 10 miles from their location to go shopping; therefore, the search radius around the user can be 10 miles 360 degrees around the user's location. The search radius can also or alternatively be based on a ratio of how large the user's location is. For example, if the user is located in Sunnyvale, Calif., which is about 22 square miles, than the radius for the user can be between 7-8 miles. The radius can vary over time, such as for example expand on weekends and shrink during working hours.

In Step 416, the engine 300 performs a search for locations of the stores/chains that fall within the search radius from the user's location. The search, which is based on the generated query from Step 414, involves, for example, analyzing an index of supported stores/companies. The index comprises information indicating store (or chain) identifiers, store names and geo-coordinates (e.g., latitude and longitude coordinates) of such stores.

Thus, according to the above example, Step 416 involves executing a search API that traverses the index and identifies the store information for those Walmart stores that are 10 miles from the user's location. In this example, by way of illustration purposes only, there are 2 Walmart stores within the 10 mile radius to the user. In some embodiments, the result of the search includes stores that are not associated with the sender; therefore, Step 416 can involve filtering out those stores via a mail backend API that identifies those stores/chains that are associated with the sender.

As a result of the search of Step 416, Step 418 involves creating, storing and applying a geo-fence to the user's device based on the geographic locations of the identified stores/chains.

That is, using the Walmart® example for illustration purposes, the location coordinates (e.g., latitude and longitude coordinates) of the 2 Walmart stores is utilized to build a geo-fence (e.g., a radial perimeter around the stores or a polygonal geo-fence) for each store such that when the user's device enters that perimeter, the user is alerted accordingly, as discussed below. The geo-fence is built according to another radial threshold (e.g., 75 meters, 1 mile, or 100 yards, for example) around a store's location. Therefore, the geo-fence for each store is constructed and applied to the user device so that when the user is detected as being within the radial threshold to an identified store/chain of the company that sent the selected message, the user will be provided a notification related to the selected message and the extracted content that was included therein, as discussed herein.

According to some embodiments, the radial threshold of a geo-fence can be based on where the location is (e.g., is it in a mall or near other stores as in a downtown area of a city), what type of network connectivity is available (e.g., is Wi-Fi available at or around the location), and the like. For example, if Wi-Fi is available for a location, then a geo-fence around a location could be set to a smaller distance, e.g., 20-50 meters.

In some embodiments, the geo-fence data is stored on the user device in association with a receiver (e.g., item 264 from FIG. 2) that provides location-identifying capabilities—for example, the accelerometers, one or more gyroscopes, or GPS receivers of the user's device. Thus, in Step 420, the positioning of the user's device is monitored, which can occur continuously or periodically according to a predetermined time period (e.g., every 15 seconds, or every 15 minutes). In Step 422, a determination is made regarding the determined current position of the user's device—that is, the engine 300 determines whether the current positon of the user device satisfies (or falls within) the geographical constraints of an applied geo-fence.

For example, continuing with the above example, a determination is made as to whether the user is within a pre-defined range (i.e., physical located within the geo-fence defined geographic region) to an identified Walmart® store. As discussed herein, this provides the system with an indication as to whether the user is near or approaching (e.g., proximate) a particular store, and if/when a notification related to the message content of the Walmart message should be surfaced from the inbox and provided to the user.

In some embodiments, if the data captured by the receiver(s) of a user's device is above a threshold value associated with a speed, velocity or acceleration value of movement, then Step 420 is repeated until such threshold value is not satisfied. This ensures that if a user, for example, is driving in a car or on a subway train, then the location of the user is not accounted for in determining if a geo-fence is triggered, as the user's speed/velocity does not indicate that the user is just passing and not "actually" at that location (or there for a period of time where a content item can be acted upon).

In Step 430, if the determination from Step 422 indicates that the user is not positioned within an applied geo-fence, then Process 400 continues monitoring for position changes of the user to compare against the applied geo-fence(s) (e.g., reverts back to Step 420).

If the determination in Step 422 results in a determination that the user is within an applied geo-fence, Step 424 results in the engine 300 causing a notification to be generated and visually or audibly (or both) displayed to the user.

According to some embodiments, the notification is generated by identifying which geo-fence has been triggered (i.e., which geo-fence the user's position currently falls within), and retrieving the message content that corresponds to that triggered geo-fence.

For example, the user is determined to be positioned near a Walmart store that has an applied geo-fence on the user's device. This determination triggers a search of the user's device and/or inbox, which results in the message content from the selected message (from Step 412) being retrieved. The engine 300 therein constructs a notification message that includes information related to this content. As discussed above, the notification message can be generated by a specific notification format controlled by the email application, or may be functionality installed and/or inherent on a user's device that can be utilized by the email application; therefore, the notification message in this example is built in a similar manner based on the retrieved message content for the message associated with the triggered geo-fence. For example an audio signal like "hey you have a coupon" can be played when a user enters a store within a geo-fence, to cut through mere beeps or tones a user may not hear in a noisy environment or may have become inured to.

Figure 5C:
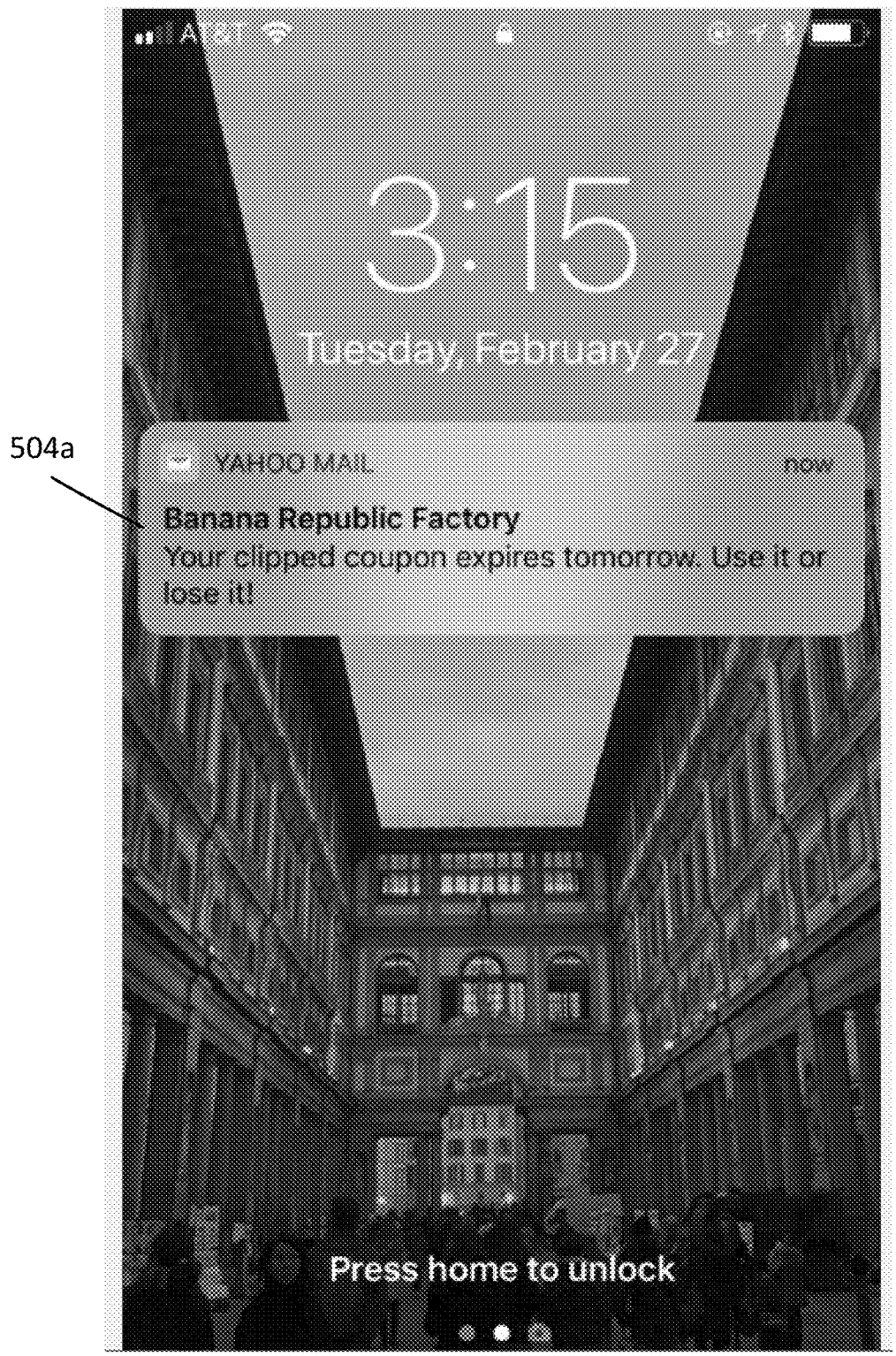
Figure 5D:
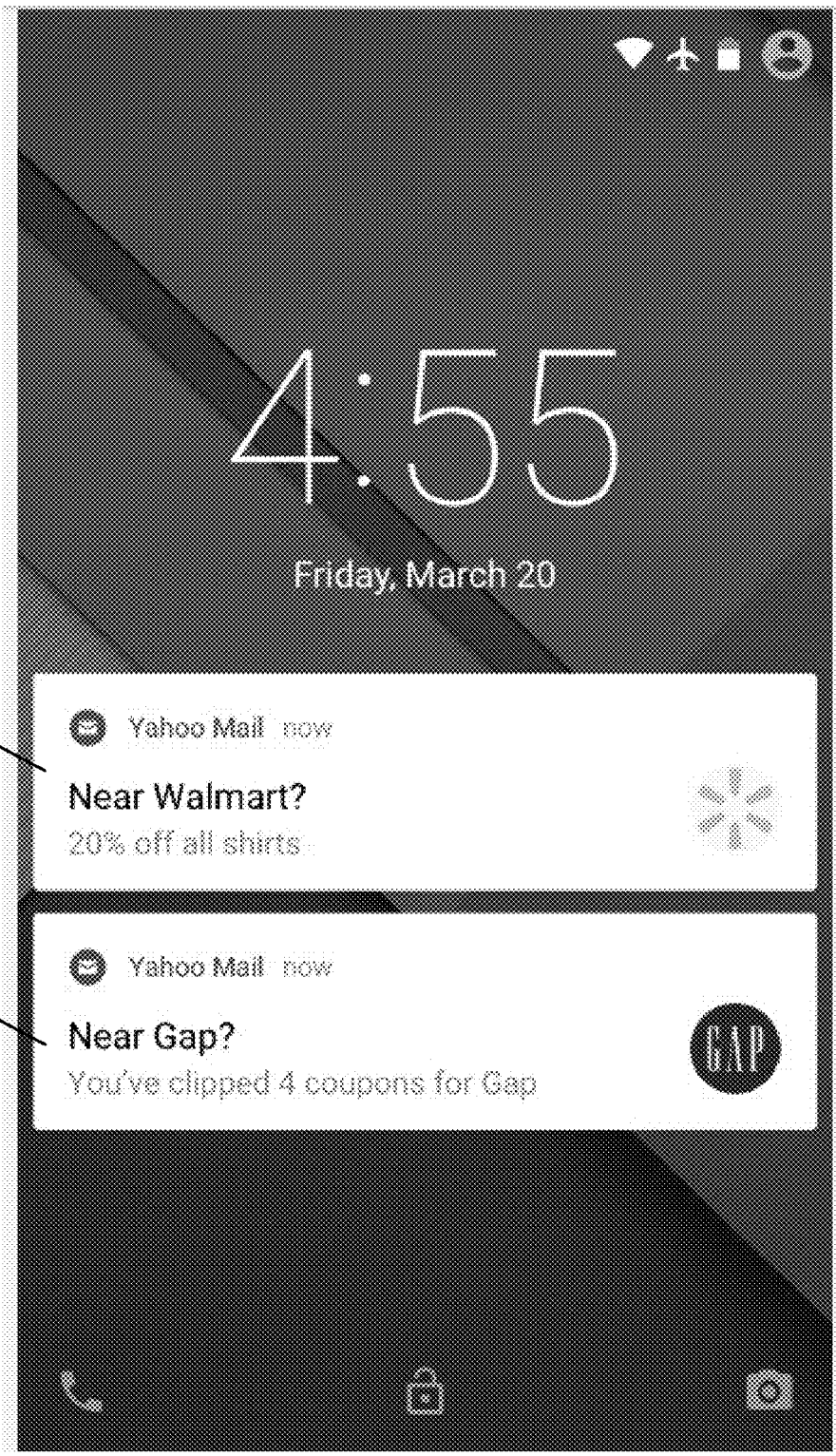

By way of a non-limiting example, FIGS. 5C and 5D display example banner notifications that are displayed to a user on the user's device from the device's lock screen. FIG. 5C displays lock screen 504 displaying a notification message 504a for a Banana Republic message that indicates that the coupon from that store is expiring tomorrow. This notification is displayed because the user was determined to be near a Banana Republic store (e.g., within an applied geo-fence for that Banana Republic store).

FIG. 5D illustrates an example where multiple notification messages 504b-504c are surfaced to the user. The lock screen 504 displays messages 504b and 504c because the user is determined to be within the physical constraints of the geo-fences for the stores of two separate senders of clipped messages in the user's inbox. For example, the user received a message from Walmart and the Gap®. The user indicated an interest in these messages and clipped them, or the system clipped them for the user. Their content was extracted, and according to the steps above from Process 400, a geo-fence was applied for regional locations of Walmart and the Gap, respectively. These stores, for example, have locations in a local mall, and when the user is walking through the hallways of wing of the mall that have these locations, these notifications 504b and 504c are generated and displayed to the user. As discussed above and below, the user can interact with these notifications to display the content from their associated messages.

In some embodiments, instead of a message specific notification being generated, a general or aggregate notification may be created that alerts the user to a message or messages that have spatially specific content to the user's location. Thus, for example, if a user walks into an area with many applied geo-fences (e.g., a mall or shopping center), instead of receiving multiple notifications, a single notification is provided so that the user is not inundated with notifications for every nearby store. In some embodiments, if multiple geo-fences are associated with a geographic area (e.g., a mall), then a meta-geo-fence can be created whereby the single notification can be provided, as discussed herein.

According to some embodiments, Steps 420 and 422 can account for how long a user is in a particular location—referred to as "dwell time". This ensures that if a user is driving on a street by a store a notification for that store is not triggered, since it may be unlikely that a driving user desires to receive notifications while driving or it could be an unsafe distraction. Thus, in some embodiments, engine 300 can be configured to wait a preset amount of time before notifying a user that the user is within a geo-fence (e.g., 15, 30 or 60 seconds). Thus, Step 420 can involve detecting the user's location, determining if it changes more than a threshold amount during the preset amount of time (to account for walking in a general area, for example), and then performing the determination of Step 422 when the location has not changed more than the threshold amount.

Continuing with Process 400, Step 426 involves a user receiving a notification message (from Step 424— because the user was determined to be within a geo-fence for a store), and then interacting with the notification, thereby opening the associated message.

Figure 5E:
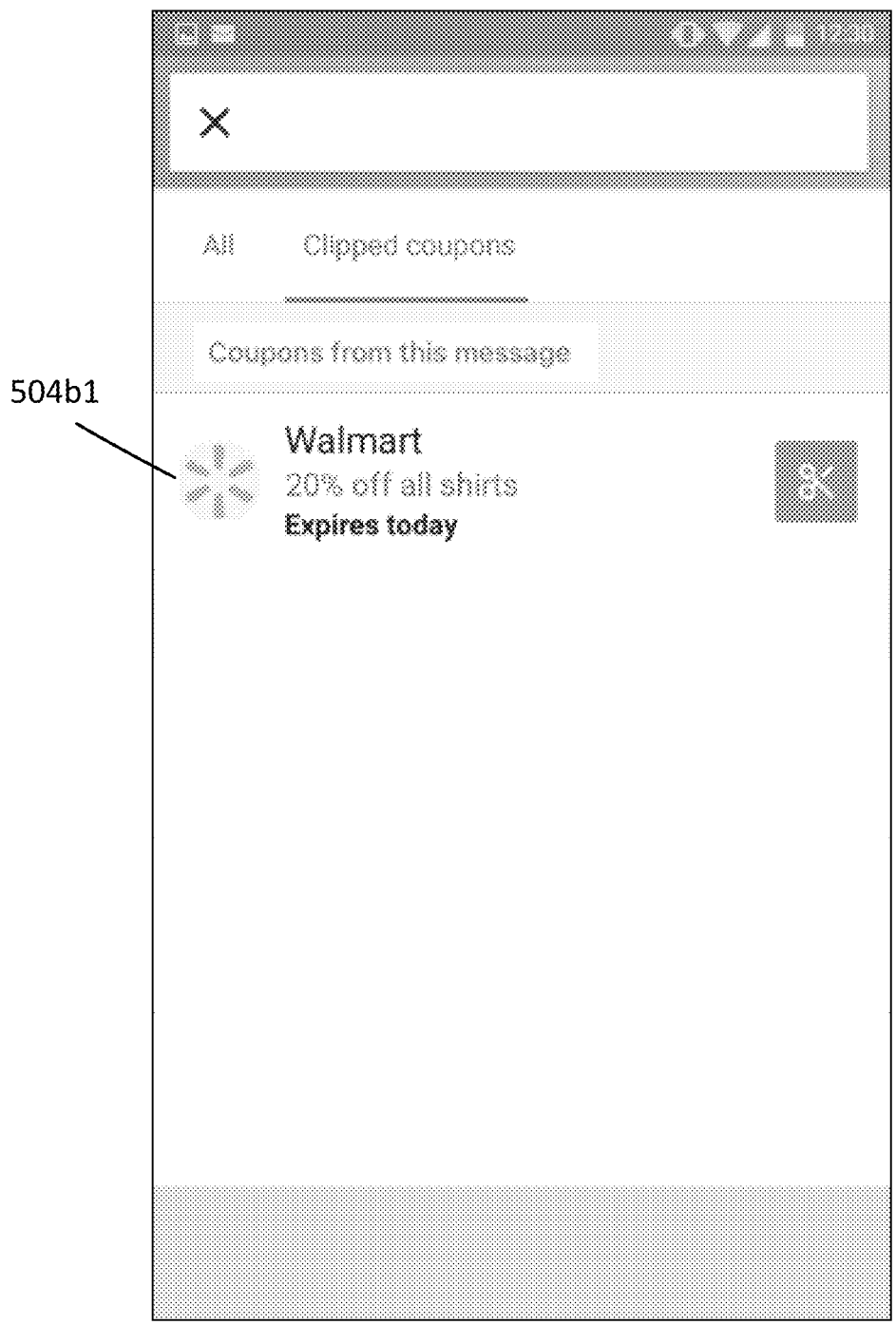

For example, continuing with the above Walmart® message example and the example from FIG. 5D, the user is provided notification message 504b. The user selects and opens the notification where the message from the user's inbox is displayed. This is illustrated in FIG. 5E, where screen 506 of the user's device/inbox is displayed which displays the message content 504b1. In some embodiments, this content 504b1 can only include the extracted content, and in some embodiments, it can include a linking feature where the selected message is displayed for user viewing and subsequent interaction.

Figure 5F:
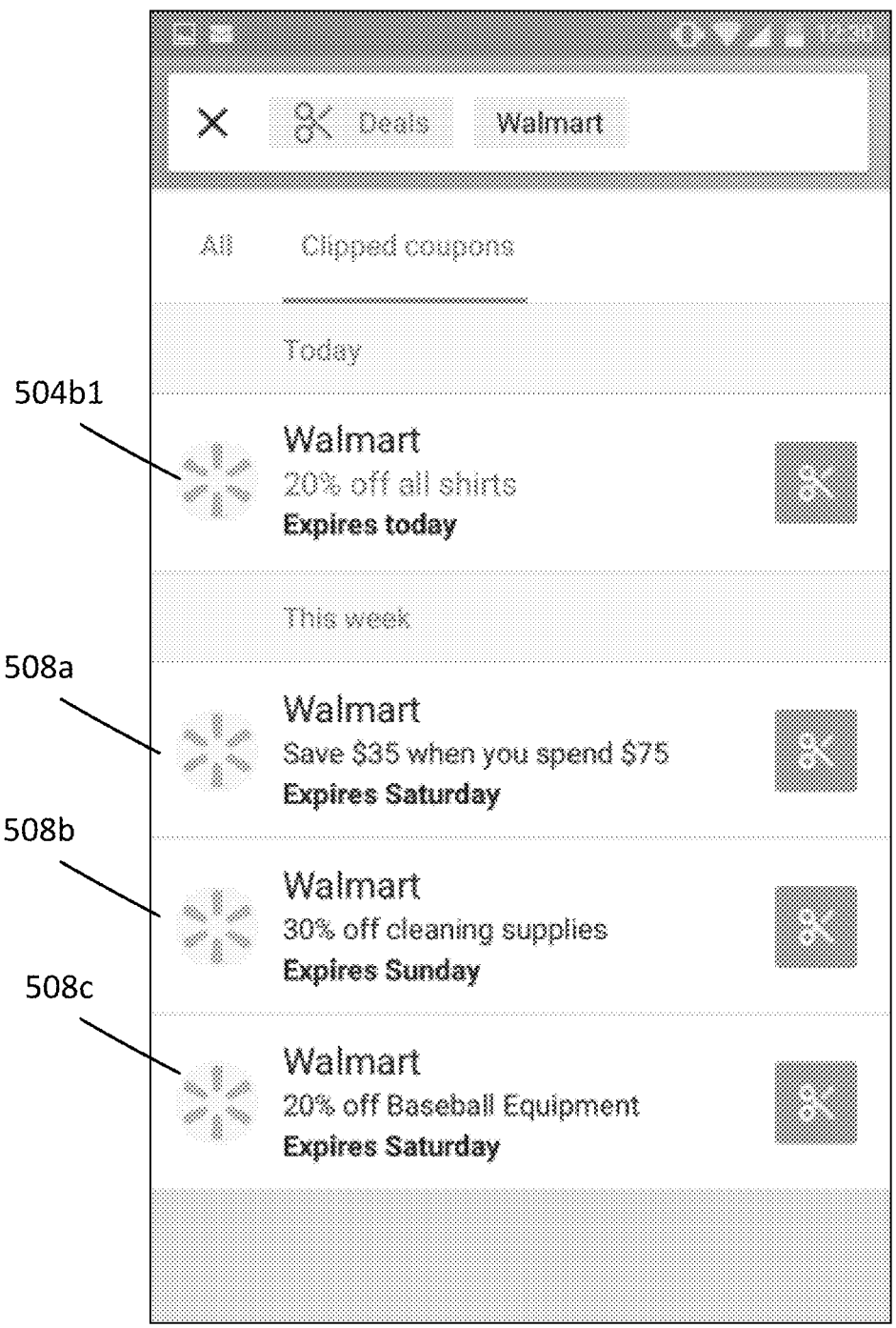

In some embodiments, as displayed in FIG. 5F, upon interacting with notification 504b, screen 508 can be displayed so that a user can interact with and/or view all of the clipped messages/content from the same store. Here, in this example, since the user opened the Walmart notification 504b, the user is provided with the content 504b1, which is associated with notification 504b, and additional clipped messages 508a-508c, which are additionally clipped messages from Walmart that may not have applied geo-fences to that particular store/branch.

In some embodiments, upon interacting with a notification, the user can be taken to the smart view folder 502, where all his/her clipped messages are displayed, as illustrated in FIG. 5B. In some embodiments, if a user does not interact with a notification for preset period of time (e.g., 2 minutes from the time it was generated and displayed), then the notification will be removed from the screen upon which it was displayed. Similarly, if a user is determined to have entered, then left a geo-fence, then the notification may be removed from the display. Such removal can occur upon a determination that the user is no longer within the confines of the geo-fence for a predetermined period of time—similar to the determination occurring in Step 422.

Upon opening the message and displaying the digital content related to the interacted notification, in Step 426, the user has the ability to convert, redeem and/or further interact with the content/data displayed therein. As discussed above, this can result in ROI and CTRs, which can be provided to the hosting service of the mail application, the sender of the message(s), third party providers, or any other entity or vender that is interested in storing, receiving and/or utilizing user usage and/or interaction information related to specific types/forms of digital content and messages (e.g., types of ads, offers and the like). Step 428.

In some embodiments, Process 400 can also be performed for "un-clipped" messages when there is expiring message content. That is, if an ad within a message is determined to expire (where the extraction occurs by the server upon receiving the message, automatically, in the background prior to delivery to the inbox), then when the expiration deadline satisfies a time threshold (e.g., 1 day), the steps of Process 400 can be performed, as discussed above. In some embodiments, a notification can be generated indicating the pending expiration of an ad, even if the user is not within the geo-fence of a store for that ad, and then again when the user is within the geo-fence, thereby providing multiple reminders for ads the user is understood to be interested in.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, at a device, in an inbox of a user, a message, the message comprising content provided by a second user and information associated with a location of the second user, the message content controlled by an extraction rule that corresponds to the second user;
   extracting, by the device, based on the extraction rule, at least a portion of the content from the message;

saving, by the device, in a folder of the inbox, the extracted content portion;
monitoring, by the device, a location of the user;
making, by the device, a determination that the user is proximate to the location of the second user;
automatically retrieving, by the device, the extracted content from the folder in response to the determination; and
causing display, by the device, of the extracted message content within a portion of the inbox.

2. The method of claim 1, wherein the extraction rule is defined by information associated with a type of the second user.

3. The method of claim 1, further comprising:
analyzing the content of the message, and identifying a structure of the message;
computing a hash based on the identified structure; and
identifying the extraction rule based on the computed hash.

4. The method of claim 3, wherein the structure of the message corresponds to structured data from semi-structured content of the message, wherein the structured data enables the extracted message portion to be modified upon display.

5. The method of claim 1, wherein the extracted content portion is saved as a separate message.

6. The method of claim 5, further comprising:
creating a link between the received message and the separate message, wherein the separate message is displayed within the portion of the inbox, wherein the link enables the received message to subsequently be displayed in an original format.

7. The method of claim 1, further comprising:
receiving an interaction with the displayed extracted message content; and
causing display of a smart folder view that displays a plurality of other extracted message content from other messages.

8. The method of claim 7, wherein the plurality of other extracted message content corresponds to a similar context as the displayed extracted message content.

9. The method of claim 1, further comprising displaying a notification for a predetermined period of time before, absent an interaction, it is removed from being displayed.

10. The method of claim 1, further comprising:
receiving, from the user, an indication as to an interest in the received message, wherein the extraction is based on the indication.

11. A non-transitory computer-readable storage medium tangibly encoded with computer-executable instructions, that when executed by a device, perform a method comprising:
receiving, at the device, in an inbox of a user, a message, the message comprising content provided by a second user and information associated with a location of the second user, the message content controlled by an extraction rule that corresponds to the second user;
extracting, by the device, based on the extraction rule, at least a portion of the content from the message;
saving, by the device, in a folder of the inbox, the extracted content portion;
monitoring, by the device, a location of the user;
making, by the device, a determination that the user is proximate to the location of the second user;
automatically retrieving, by the device, the extracted content from the folder in response to the determination; and
causing display, by the device, of the extracted message content within a portion of the inbox.

12. The non-transitory computer-readable storage medium of claim 11, wherein the extraction rule is defined by information associated with a type of the second user.

13. The non-transitory computer-readable storage medium of claim 11, further comprising:
analyzing the content of the message, and identifying a structure of the message;
computing a hash based on the identified structure; and
identifying the extraction rule based on the computed hash.

14. The non-transitory computer-readable storage medium of claim 13, wherein the structure of the message corresponds to structured data from semi-structured content of the message, wherein the structured data enables the extracted message portion to be modified upon display.

15. The non-transitory computer-readable storage medium of claim 11, wherein the extracted content portion is saved as a separate message.

16. The non-transitory computer-readable storage medium of claim 15, further comprising:
creating a link between the received message and the separate message, wherein the separate message is displayed within the portion of the inbox, wherein the link enables the received message to subsequently be displayed in an original format.

17. The non-transitory computer-readable storage medium of claim 11, further comprising:
receiving an interaction with the displayed extracted message content; and causing display of a smart folder view that displays a plurality of other extracted message content from other messages.

18. A computing device comprising:
a processor; and
a non-transitory computer-readable storage medium for tangibly storing thereon program logic for execution by the processor, the program logic comprising:
logic executed by the processor for receiving, in an inbox of a user, a message, the message comprising content provided by a second user and information associated with a location of the second user, the message content controlled by an extraction rule that corresponds to the second user;
logic executed by the processor for extracting, based on the extraction rule, at least a portion of the content from the message;
logic executed by the processor for saving in a folder of the inbox, the extracted content portion;
logic executed by the processor for monitoring a location of the user;
logic executed by the processor for making a determination that the user is proximate to the location of the second user;
logic executed by the processor for automatically retrieving the extracted content from the folder in response to the determination; and
causing display of the extracted message content within a portion of the inbox.

19. The computing device of claim 18, wherein the extraction rule is defined by information associated with a type of the second user.

20. The computing device of claim 18, further comprising:
logic executed by the processor for receiving an interaction with the displayed extracted message content; and logic executed by the processor for causing display of a smart folder view that displays a plurality of other extracted message content from other messages.

\* \* \* \* \*